Sept. 7, 1943.  W. R. ROYER  2,328,680
TIRE CHAIN TOOL
Filed Oct. 11, 1940  3 Sheets-Sheet 1
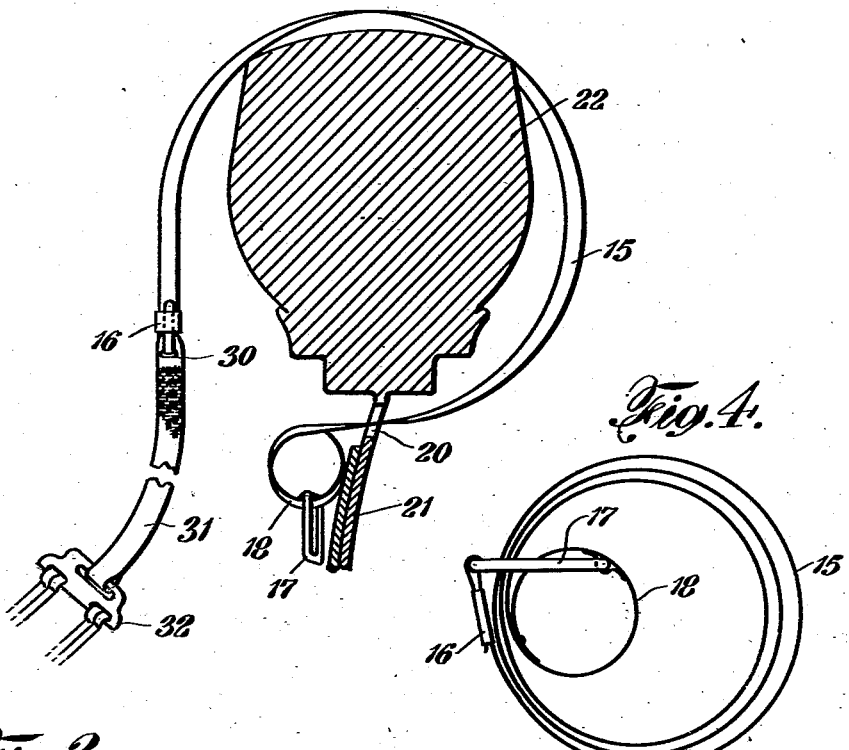
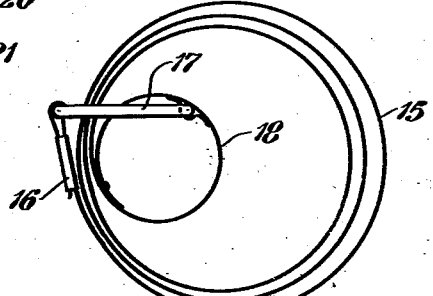
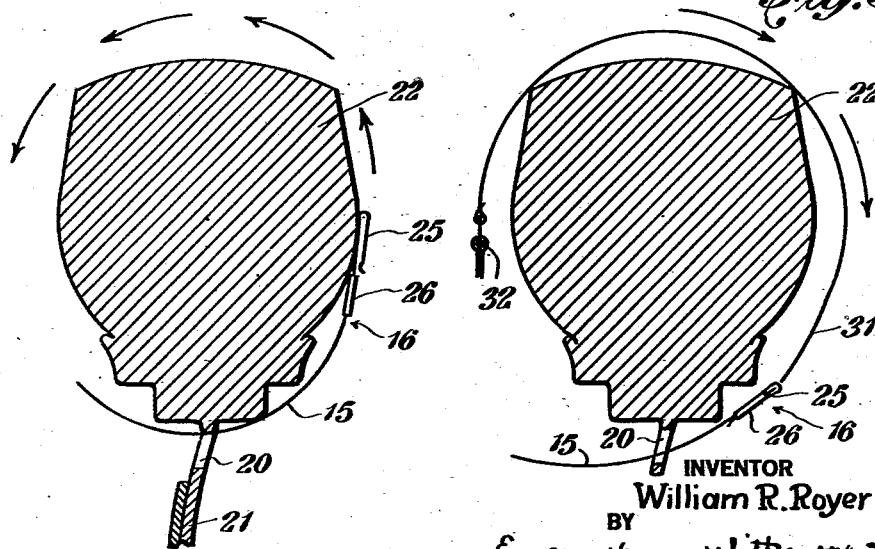
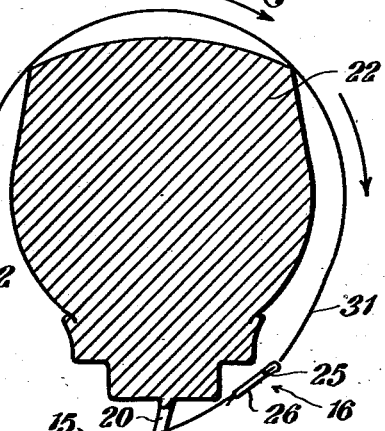
INVENTOR
William R. Royer
BY
Emery, Varney, Whittemore & Dix
ATTORNEYS

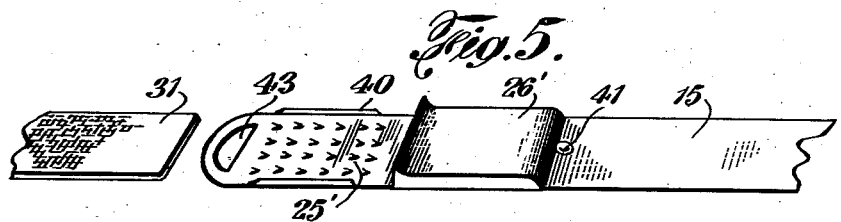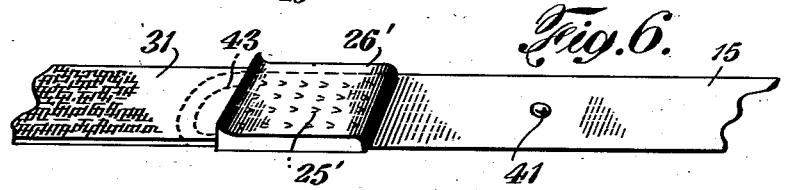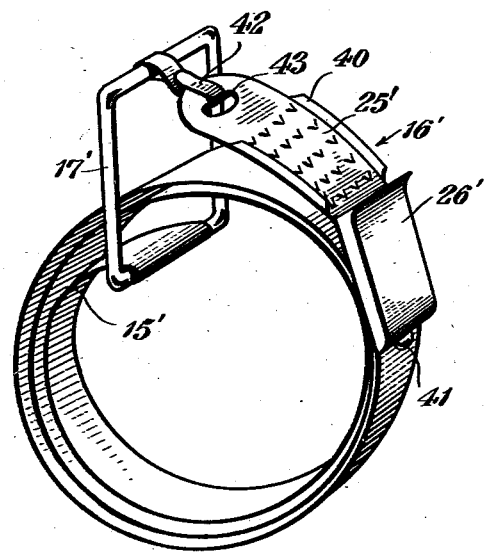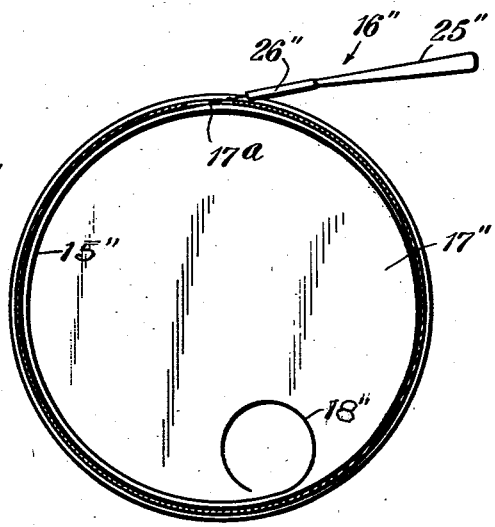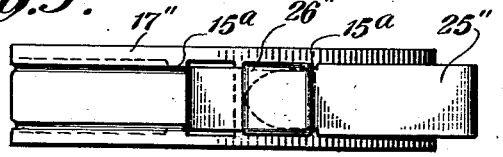

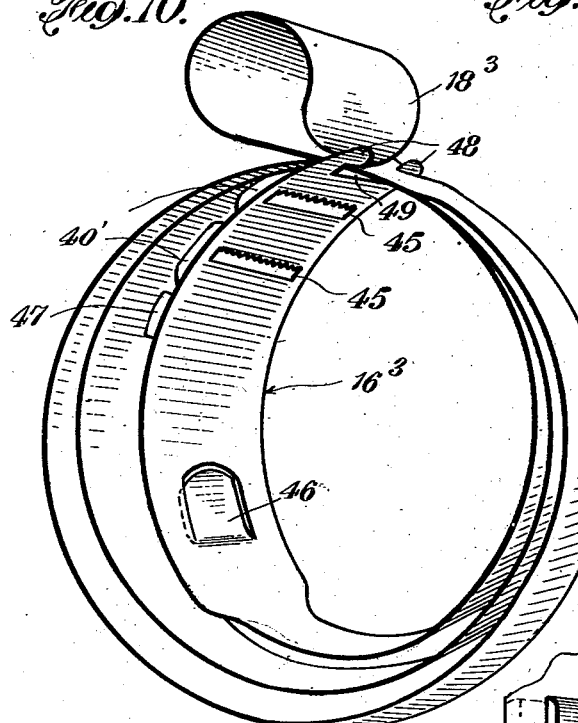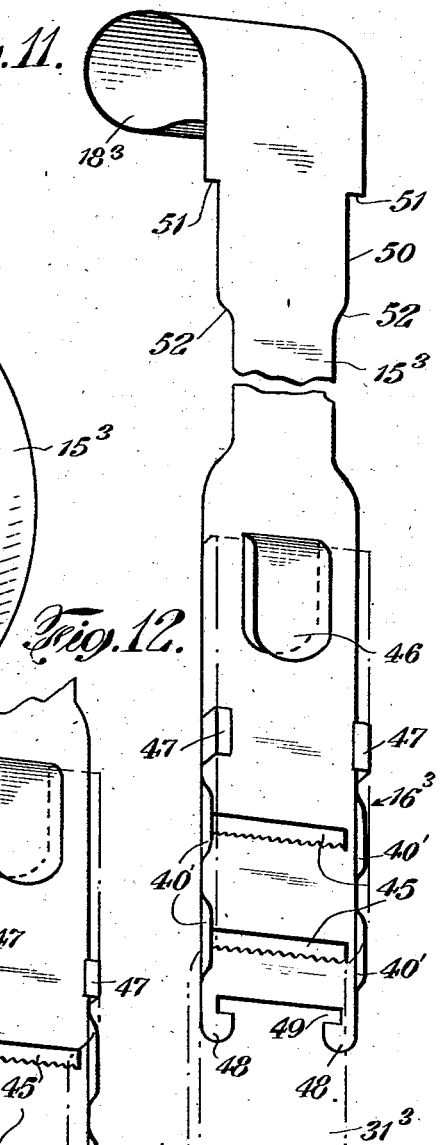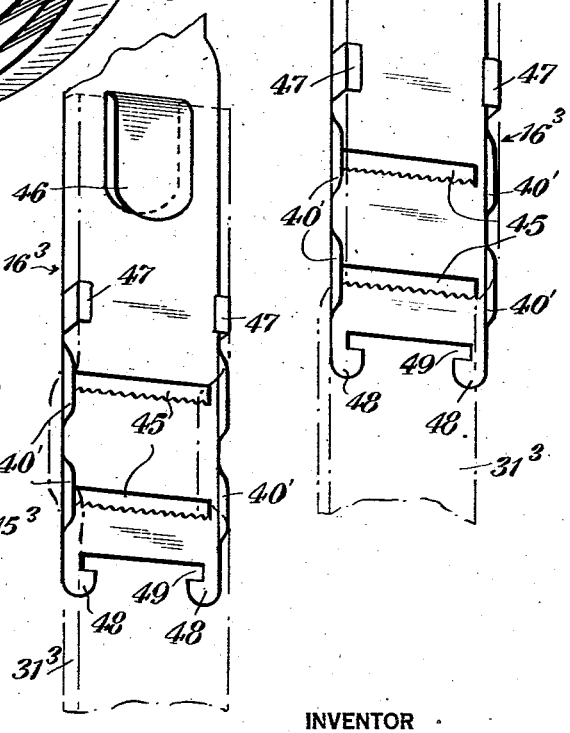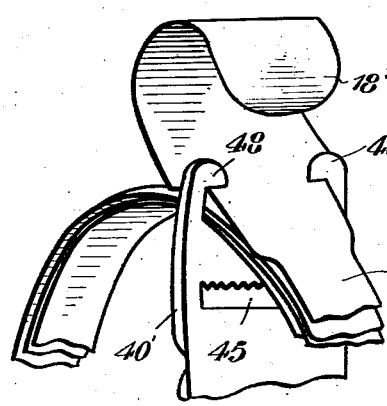

Patented Sept. 7, 1943

2,328,680

UNITED STATES PATENT OFFICE 2,328,680

TIRE CHAIN TOOL

William R. Royer, Wilkes-Barre, Pa.

Application October 11, 1940, Serial No. 360,720

4 Claims. (Cl. 81—15.8)

This invention relates to a tire chain tool which is designed to be used for guiding the securing strap of an anti-skid chain unit around the tire and has for an object the provision of improvements in this art.

The public is now familiar with the type of anti-skid chain which consists of one or more transverse chains and a fabric strap for securing the chain on the tire. The difficulties of placing these chain units on a tire are also well known. These difficulties are increased by the modern trend toward deep-well fenders which cover so much of the tire and make it practically impossible to reach behind the tire except near the ground. As a consequence it is often necessary to move the car after each chain unit is applied, thus making the total time for applying the chains considerable.

Of course, the application of the chain units is easier when the wheel happens to be of the spoked type with ample space between spokes, but such wheels are now almost obsolete and many cars are equipped with disc wheels which provide only small holes for the straps of skid chains. Others have no openings at all; and when openings are made they will naturally be formed as small as possible. In general, however, the space through the wheel is very small and it is desirable to have a tool to assist in applying the chains. In any event, such a tool is advantageous because it minimizes the soiling of clothes and hands.

In view of this problem certain tools have heretofore been designed for carrying the chain strap around the tire. However, all such tools with which applicant is acquainted have various faults for practical use. For one thing, some of them are made with joints to enable them to be folded within a small space, and this causes them to fold in use at times. For another thing, these joints or other obstructions cause the tool to catch on the tire or parts of the wheel to obstruct the operation. Further, the coupling for the tool to the strap is unsatisfactory and often so large as to be incapable of passing through the small openings provided therefor.

According to the present invention there is provided a tool comprising a continuous thin resilient flat band which is free from obstructions along its length and which has at its end an efficient coupling for the chain strap which will pass through a hole which is little larger than the cross-section of the band. In particular, the coupling is designed to thread itself and the accompanying chain strap easily back through the hole through the wheel. The band is in the form of a smooth spring coil which has no abrupt bends and which cannot readily be deformed into angular bends, but which on the other hand can be reduced to a coil of small size when not in use. The invention also comprehends the inclusion of a convenient holder for the coil, which holder may be in the form of a closed container or a loop to embrace the several wound-up layers of the coil.

The above as well as various other objects and features of the invention will be apparent from the following description of certain illustrative embodiments thereof which are shown in the accompanying drawings wherein:

Fig. 1 is a perspective view, partly in section, showing one embodiment in use;

Fig. 2 is a side view showing the end of the tool band being threaded through an opening in the wheel;

Fig. 3 is a similar view showing the chain strap being drawn through the wheel opening;

Fig. 4 is an edge view of the band in its wound-up condition;

Fig. 5 is a top angle view of a modified coupling device in open position;

Fig. 6 is a similar view after the chain strap has been secured in the tool strap coupling;

Fig. 7 shows the device of Figs. 5 and 6 in wound-up condition;

Fig. 8 is a flat section through a modified form of tool and its container;

Fig. 9 is a top view of Fig. 8;

Fig. 10 is a perspective view of another modification in coiled condition;

Fig. 11 is an angular plan view of the device in uncoiled condition;

Fig. 12 is a view of one end of the device showing another way of attaching a strap; and Fig. 13 is an enlarged detail.

Referring to Figs. 1–4, the tool comprises a smooth flat resilient coiled band 15 which is free from angular bends or projections along its length, a coupling device 16 at the outer end of the band, and a holder 17 at its inner end. In this embodiment the holder is formed as a closed loop which is hinged to a closed coil 18 formed on the inner end of the band. The finger of the operator may be passed through this coil in using the tool. The holder loop is adapted to receive several turns of the resilient strap when it is wound up, as shown in Fig. 4. In this position the strap coupling device may be secured to the holder loop, also as shown in Fig. 4, to keep the band from uncoiling. The coil 18 is made large enough to avoid passing through the holder loop 17. It will also be noticed from Fig. 1 that the coil 18 is of sufficient size to deter the passage of this end of the tool through the opening 20 in the wheel, the wheel in this view being formed as a disc 21. The tire is indicated at 22 in general cross-section, no attempt being made to show the details of the tire, tube and rim.

The coupling device comprises a narrow flat hook 25 and a slidable sleeve 26 adapted to move over the hook, as shown in Figs. 1, 3 and 4, or off the hook, as shown in Fig. 2. A projection or protuberance may be provided on the strap to prevent the sleeve from slipping too far back, the projection being smooth so as not to catch during use.

The tool is used as shown in Figs. 1-3. In Fig. 2 the coupling end of the tool has been inserted through the opening 20 in the wheel and is pushed upward, coiling toward or against the tire because of its coiled shape and inherent springy character as it moves around the tire. The sleeve 26 may be off the hook 25 of the coupling device at this time. When the band end has reached the front side of the tire the hook 25 is passed through a hole 30 in the end of the strap 31 of the tire chain unit 32 and is secured by the sleeve 26. The band is then pulled back with the strap, as shown in Fig. 3, until the end of the strap comes through the wheel opening 20 where it can be grasped. The coupling member is sufficiently small to pass easily with the strap through the opening. During this threading movement if the sleeve 26 rubs on the tire it will only move more securely down on the hook. It does not matter if the sleeve rubs off the hook in Fig. 2.

After use the band may be threaded through the holder loop 17 a number of times until a small size is attained and the hook then secured to the end of the loop, as shown in Fig. 4.

In Figs. 5, 6 and 7 a modification is shown in which the inner coil of the band is eliminated and in which the coupling device is formed to grasp the chain strap without requiring a hole therein. Here the coupling 16' comprises a roughened end 25', as of teeth struck up from the material, and pointing inward and a sleeve 26' adapted to slide over the end. The inner end of the sleeve is tapered to grip the strap upon the teeth of the band. Side flanges 40 of less height than the thickness of the strap are provided for holding the strap laterally. The inner ends of the flanges also engage the tapered end of the sleeve to keep it from slipping off the band. A projection 41 on the band prevents the sleeve from moving back too far along the band. A hook 42 secured to the holder loop 17' engages a hole 43 in the end of the band 15' to hold the tool in coiled condition, as shown in Fig. 7.

The form shown in Figs. 5-7 is used like the first form except as to the manner of coupling to the chain strap. In the second form the strap end is laid on the toothed end of the band and the sleeve 26' pushed on over it until tightened. The outer end of the sleeve is flared to assist this action. When the band is pulled back the tapered end of the sleeve assists in threading back through the wheel opening. As before, any rubbing of the sleeve on the tire will not cause difficulty in the operation of the tool.

In the embodiment shown in Figs. 8 and 9 the holder 17" is formed as a short cylindrical container having an edge opening 17a through which the band 15" passes in and out. A loop 18" is formed on the inner end of the band. This may be a fully closed loop which will prevent complete withdrawal of the band or it may, as shown, be an open loop which can be sprung to permit complete removal of the band. In the latter case the loop serves as a finger grip for manipulating the tool.

The coupling device 16" may be like either of the previous forms. As shown it is made as a flat hook 25" with a sleeve 26". The outer end of the hook is sufficiently deep to resist entry into the opening 17a, considering the angle of entry of the tape; but if desired the sleeve may be left well down on the tape so that the hook will engage over the peripheral wall of the holder at the edge of the hole. The band may be narrowed in the region in which the sleeve operates, the edge shoulders 15a limiting its sliding movement. The spring band, being relatively stiff, may readily be pushed back in the container after use.

In the modification shown in Figs. 10-13 the band $15^3$ is provided with a coil $18^3$ at its inner end and with a modified coupling device $16^3$ at its outer end. This coupling device comprises one or more openings 45 through which the strap $31^3$ is adapted to be threaded and a lip or tab 46 beneath which the end of the strap may be secured. The edges of the openings may be serrated, as shown, the better to engage the strap, though the sharp edges of the thin band metal (for example, 25 gauge spring brass or steel) will grip well even without the serrations. The strap may be threaded through one of the openings, as shown in Fig. 11, or through both of them, as shown in Fig. 12, the latter disposition providing adequate grip for even a very thin or pliable strap. Side flanges 40' hold the strap laterally in position, and if desired, overhanging cleats 47 may be provided for holding the strap down flat on the band.

In this form the outer end may provide the holder for the coiled-up band. For this purpose it is formed with a pair of spaced overhanging hooks 48 beyond a recess 49 which is large enough to take the several thicknesses of the band. The band is made wide at the coil $18^3$ and is narrowed back therefrom at 50 to provide stop shoulders 51 for the hooks. Further along, the band is narrowed more, as at the tapered shoulders 52, to provide a portion sufficiently narrow to enter between the hooks. This is all shown clearly in Fig. 13. If desired, the narrowest portion of the band may extend throughout most of its length, continuing from the tapered shoulders 52 almost to the tab 46.

It will be obvious that this device with the chain strap coupled thereto is not much thicker than the strap alone and that the parts are so directed as to present the minimum obstruction to pulling the end of the strap through the holes in the wheel rim, it being noted particularly by reference to Figs. 10, 11 and 12 that the tab 46 is tapered from its outer surface to its root or point of attachment to the band. It may be very quickly coiled up, as shown in Figs. 10 and 13, the resiliency of the band being sufficient to pull the shoulders 51 back against the hooks 48 to maintain the coiled disposition. In this and all other forms the band has an inherent resiliency and permanent set to take a position of radius smaller than the tire radius and greater than the radius of the smallest coil into which it is formed for storage.

The band will be made sufficiently long to serve all normal tires encountered, even in truck sizes.

The unused part remains coiled and out of the way in using the tool.

It is thus seen that the invention provides a skid chain applying tool which is very handy in use and which may be stowed in a very small space when not in use. It is adapted to pass through very small wheel openings and does not resist movement in either direction. On the return movement it assists in threading back through the opening. It does not catch against the tire but its spring coil shape causes it to follow along the tire wall as it moves around toward the front of the tire. It is naturally curved smoothly and resists bending into angular shapes.

While certain embodiments of the invention have been described it is to be understood that the invention may have various embodiments within the limits of the prior art and the scope of the subjoined claims.

I claim:

1. A skid chain applying tool comprising a smooth flat band without obstructions between its ends and having a permanent resiliency in a coiled shape, manipulating means at one end of the band, and coupling means at the other end for engaging the end of a chain strap, said coupling means including an opening in which the strap may be placed and a tab under which the outer end of the strap may be secured, said tab being disposed longitudinally of the band and opening toward the end of the band so as to receive the end of the chain strap as it emerges from the opening.

2. A skid chain applying tool comprising a smooth flat band without obstructions between its ends and having a permanent resiliency in a coiled shape, manipulating means at one end of the band, coupling means at the other end for engaging the end of a chain strap, hooks forming a recess at one end of the band for embracing several thicknesses of the band, and a widened portion and shoulders on the other end of the band adapted to be engaged by the hooks for holding the band in coiled-up position.

3. A skid chain applying tool comprising a smooth flat band without obstructions between its end zones and having a permanent resiliency in a coiled shape of curvature less than that of a tire with which it is to be used but greater than its curvature when coiled upon itself one or more times, a small permanent coil in one end of the band for manipulating it with the fingers, a doubly narrowed portion adjacent the coil the wider part of which ends in side shoulders, coupling means at the other end of the band for securing the end of the chain strap to the band, and overhanging hooks at the end of the band for engaging the coil end of the strap at the narrowed portion and shoulders for holding it resiliently coiled upon itself.

4. A skid chain applying tool comprising a smooth flat band without obstructions between its end zones and having a permanent resiliency in a coiled shape of curvature less than that of a tire with which it is to be used but greater than its curvature when coiled upon itself one or more times, a small permanent coil in one end of the band for manipulating it with the fingers, a doubly narrowed portion adjacent the coil the wider part of which ends in side shoulders, coupling means at the other end of the band for securing the end of a chain strap to the band, and overhanging hooks at the end of the band for engaging the coil end of the strap at the narrowed portion and shoulders for holding it resiliently coiled upon itself, said coupling means including two spaced openings for the strap, a tab open toward the end of the band adapted to overlie the end of the strap and retain it against one face of the band, flanges adjacent the ends of said openings adapted to retain the sides of the strap, and overhanging side cleats between the openings and the tab to hold the strap to the band.

WILLIAM R. ROYER.